United States Patent [19]

Isobe

[11] 4,296,850
[45] Oct. 27, 1981

[54] REAR HUB HAVING IMPROVED MOUNTING OF A CYLINDRICAL BEARING MEMBER TO AN INNER MEMBER

[75] Inventor: Mitsuhide Isobe, Toyonaka, Japan

[73] Assignee: Shimano Industrial Company, Limited, Osaka, Japan

[21] Appl. No.: 128,832

[22] Filed: Mar. 10, 1980

[30] Foreign Application Priority Data

Mar. 19, 1979 [JP] Japan .................................. 54-36082

[51] Int. Cl.³ ...................... F16D 41/18; F16C 35/07; F16H 55/30
[52] U.S. Cl. ..................................... 192/64; 308/192; 474/160
[58] Field of Search ......................... 192/64; 308/192; 474/160

[56] References Cited

U.S. PATENT DOCUMENTS

| 4,102,215 | 7/1978 | Nagano et al. | 474/160 |
| 4,145,095 | 3/1979 | Segawa | 308/192 |
| 4,198,876 | 4/1980 | Nagano | 474/160 |

Primary Examiner—Allan D. Herrmann
Attorney, Agent, or Firm—Stevens, Davis, Miller & Mosher

[57] ABSTRACT

Disclosed is an improvement in a rear hub for a bicycle, which hub has an inner member at one axial end of a hub shell, a cylindrical bearing member mounted on the inner member axially outwardly thereof, and an outer member having at least one sprocket and being supported unidirectionally rotatably to the inner member through a pair of first and second bearings. A tubular receiving portion for receiving the cylindrical bearing member is formed axially outwardly of the inner member, and a fitting portion having an inner periphery of a larger diameter than an outer diameter of the receiving portion is formed at the central portion of the cylindrical bearing member, to form an annular space between the outer periphery of the receiving portion and the inner periphery of the fitting portion. A sleeve is inserted into the space, making it possible to fix the cylindrical bearing member at a desired position on said receiving portion.

9 Claims, 5 Drawing Figures

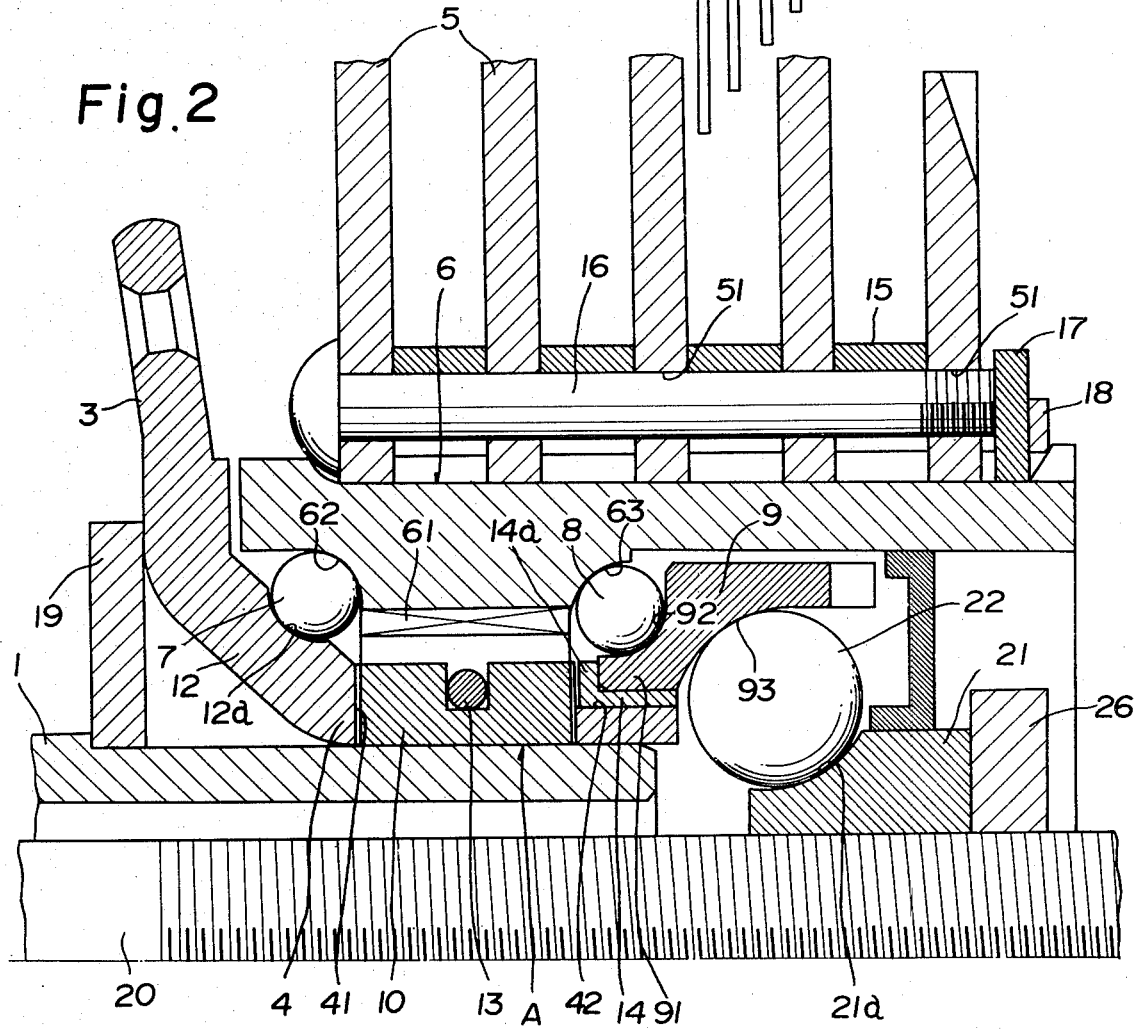

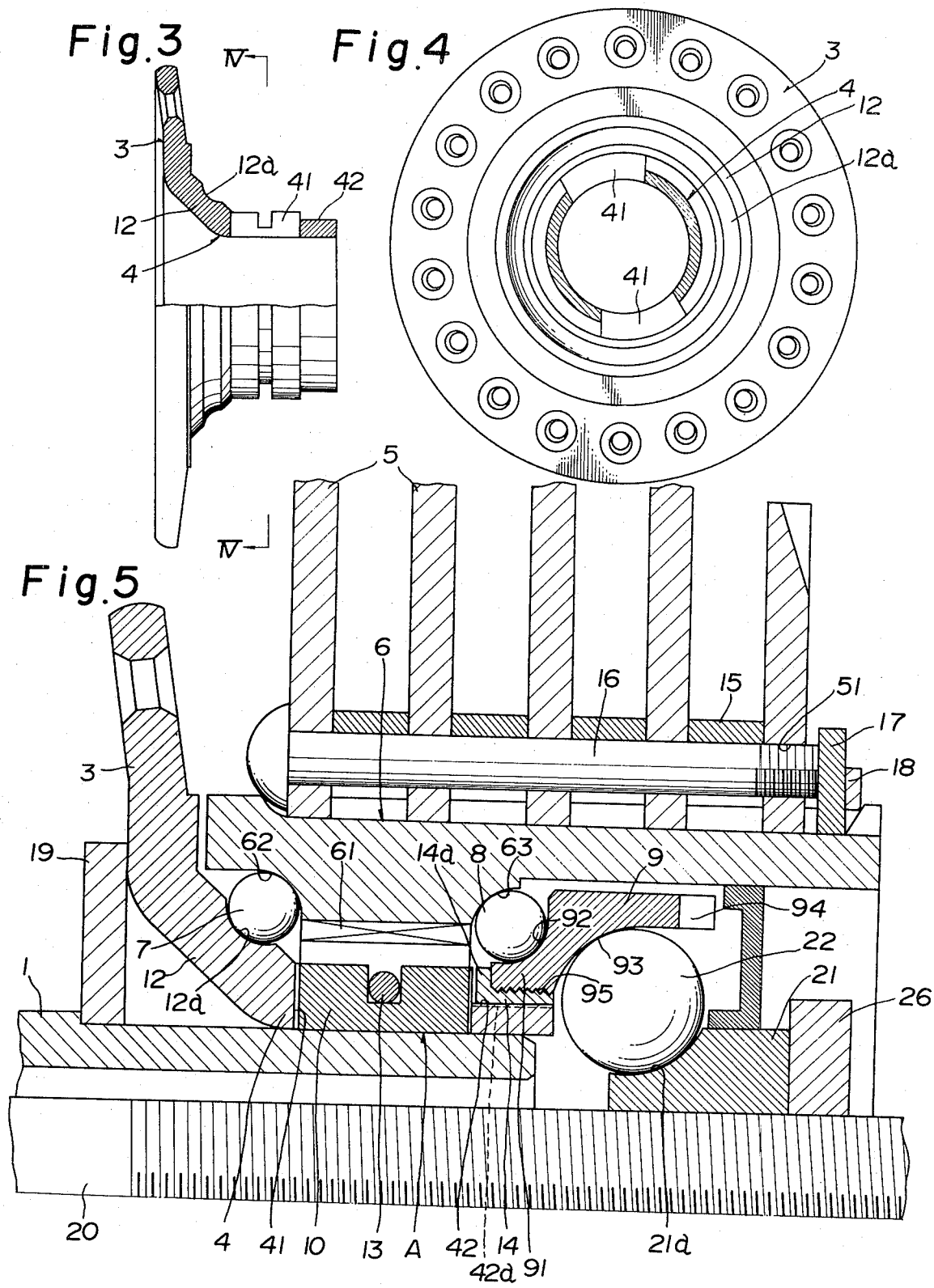

4,296,850

REAR HUB HAVING IMPROVED MOUNTING OF A CYLINDRICAL BEARING MEMBER TO AN INNER MEMBER

BACKGROUND AND SUMMARY OF THE INVENTION

This invention relates to a rear hub for a bicycle, and more particularly to a rear hub for a bicycle, which has an inner member provided at one axial end of a hub shell and an outer member carrying at least one sprocket and being supported unidirectionally rotatably to the inner member through a cylindrical bearing member having ball races.

Generally, this kind of rear hub is provided at one axial end of the hub shell with the inner member carrying pawls. Onto the outer periphery of the inner member is sleeved the outer member which is provided at its inner periphery with ratchet teeth engageable with the pawls and at the outer periphery with sprockets. A cylindrical bearing member is screwed with the outer periphery of an axially outward end at the inner member and balls are interposed between the cylindrical bearing member and the outer member and between the outer member and the inner member, so that the outer member may be supported unidirectionally rotatably to the inner member.

The outer member conventionally is adjusted in its freely rotating condition in such a manner that one or more adjusting plates are used to adjust the cylindrical bearing member in position screwable with the inner member, the cylindrical bearing member being tightened by a lock nut and fixed at a proper position. Since this adjustment requires one to increase or decrease the number of adjusting plates, it takes a significant amount of time.

Where an error in precision in one or more of the above described members makes it impossible to adjust the outer member in its rotating condition by use of only one adjusting plate, one or more plates should be added after removal of the cylindrical bearing member from the inner member. Thereafter, the cylindrical bearing member should be fixed to the inner member by being rescrewed thereto. Furthermore, balls interposed between the cylindrical bearing member and the outer member escape following the removal of cylindrical bearing member. Hence, the outer member is not only very difficult to adjust in its rotating condition but it is also difficult to assemble. Also, an unbalanced load, if applied to the cylindrical bearing member, causes thrust thereon to move the bearing member slightly axially. As a result, the rotating condition of the outer member or hub shell deteriorates quickly.

In order to overcome the above problems, the present invention has been designed. An object of the invention is to provide a rear hub capable of facilitating adjustment of the outer member in its rotating condition, simplifying an assembly of the outer member, and keeping the outer member and hub shell in proper rotating conditions for a long time even when the cylindrical bearing member is subjected to an unbalanced load.

The present invention is directed to improvements in a rear derailleur for a bicycle, which derailleur has an inner member at one axial end of a hub shell, a cylindrical bearing member mounted on the inner member axially outwardly thereof, and an outer member having at least one sprocket and being supported unidirectionally rotatably to the inner member through a pair of first and second bearings. This invention is characterized in that the inner member has at its axially outward portion a receiving portion for receiving thereon the cylindrical bearing member, the cylindrical bearing member is provided at its central portion with a tubular fitting portion of an inner diameter larger than an outer diameter of the receiving portion, and between the outer periphery of the receiving portion and the inner periphery of the fitting portion is formed an annular space into which a sleeve is press-fit, so that the cylindrical bearing member may be fixed at a desired position on the receiving portion.

In other words, this invention has been designed to improve the conventional screwable fixing of the cylindrical bearing member to the inner member. Instead of the screwable fixing, the cylindrical bearing member is press-fit onto the inner member by use of a sleeve separate from the cylindrical member and inner member, thereby being fixed at a desired position thereon.

In greater detail, the sleeve is formed mainly of synthetic resin, such as diureide compound, or nonferrous metal, such as aluminum or copper. After being press-fit onto the inner member, the cylindrical bearing member is released from a force applied thereto in the direction of press-fitting, and at which time a spring back is generated to fix the cylindrical member at its optimum position to allow the outer member to freely rotate.

The inner member and cylindrical bearing member are usually formed of steel and have a hardened surface to improve their wear-resistance. Hence, a direct press-fit of the cylindrical bearing member onto the inner member will produce cracks thereon. However, the use of a sleeve prevents cracks on both aforesaid members and the aforesaid spring back is utilized to fix the cylindrical bearing member at the optimum position with respect to the inner member. As a result, conventional adjusting plates are not required thereby eliminating the above described problems associated with their use.

These and other objects and novel features of the invention will be more apparent from the description of an embodiment thereof shown in the accompanying drawings.

BRIEF DESCRIPTION OF THE DRAWINGS

FIG. 1 is a partially cutaway front view of a rear hub of the invention,

FIG. 2 is a partially enlarged sectional view thereof,

FIG. 3 is a partially cutaway front view of a hub flange and inner member,

FIG. 4 is a sectional view taken on the line IV—IV in FIG. 3, and

FIG. 5 is a partially enlarged sectional view of a modified embodiment of the invention.

DETAILED DESCRIPTION OF THE INVENTION

The rear hub of the invention is basically of well-known construction. In FIG. 1, the rear hub of the invention is provided with, a tubular hub shell 1 having a pair of first and second hub flanges 2 and 3, an inner member 4 fixed at one axial end of the hub shell 1, an outer member 6 being supported rotatably with respect to the inner member 4 and having at the outer periphery at least one sprocket (five sprockets shown in FIG. 1), a pair of first and second bearings 7 and 8 supporting the outer member 6 rotatably to the inner member 4, a cylindrical bearing member 9 fixed thereto and carrying the second bearing 8, and a unidirectionally rotary transmission comprising pawls 10 mounted on the outer periphery of inner member 4 and ratchet teeth 61 formed at the inner periphery of outer member 6.

Referring to FIGS. 1 and 2, the hub shell 1 is made from a metallic pipe and extends at one axial end axially outwardly from the second hub flange 3, and the inner member 4, integral with the second hub flange 3 is press-fit onto the extension of hub shell 1 and secured thereto.

The second hub flange 3 and inner member 4, as shown in FIG. 3, are made from a single metallic plate and are integral with each other. A cone-like shaped portion 12 connecting the second hub flange 3 and inner member 4 is provided with a ball race 12a for the first bearing 7.

The inner member 4, as shown in FIGS. 3 and 4, is provided at its axially intermediate portion with a plurality of through bores 41 (two bores are usually formed as shown in FIG. 4) which extend radially of the inner member 4 and are disposed circumferentially thereof at regular intervals, and at the outer periphery axially outward from the through bores 41 with a tubular receiving portion 42.

The receiving portion 42 is for insertably receiving thereon the cylindrical bearing member 9 and has no screw thread. The inner member 4 is press-fit onto the extension of hub shell 1, so that the through bores 41 together with the surface of the extension, form chambers A for accommodating therein the pawls 10, the pawls 10 being supported and biased by a C-shaped spring 13 in the direction of meshing with the ratchet teeth 61.

The cylindrical bearing member 9 is provided at its one axial side (the left side in FIG. 2) with a tubular fitting portion 91 having an inner diameter larger than an outer diameter of receiving portion 42. The fitting portion 91 is provided at its radially outer surface with a ball race 92 for the second bearing 8 and at the axially outer surface with a ball race 93 for a bearing to be hereinafter described. When the fitting portion 91 at the cylindrical bearing member 9 is inserted onto the receiving portion 42 at the inner member 4, an annular space is formed between the outer periphery of receiving portion 42 and the inner periphery of fitting portion 91.

Hence, the cylindrical bearing member 9 is loosely fit onto the inner member 4 through the space, but a sleeve 14 described in greater detail below is inserted into the space, so that the cylindrical bearing member 9 is press-fit onto the inner member 4 through the sleeve 14 and fixed at a desired position on the inner member 4.

The sleeve 14 is formed of synthetic resin, such as diureide compound, or nonferrous metal, such as aluminum or copper, and has a thickness of about 0.5 to 10 mm. The sleeve 14, when inserted into the space between the fitting portion 91 and the receiving portion 42, compensates for distortion of the inner member and cylindrical member 9. Also, the sleeve 14 is provided at one axial end thereof with a flange 14a extending radially outwardly of the sleeve 14 and contacting with an end face of cylindrical bearing member 9. Alternatively, the sleeve 14 may be made from iron.

However, the sleeve 14, which is formed of synthetic resin or nonferrous metal, not only compensates the distortion at the inner member 4 and cylindrical bearing member 9, but also facilitates press-fitting of the sleeve 14 into the fitting portion 91 or onto the receiving portion 42. Hence, it is preferable to form the sleeve 14 of synthetic resin or nonferrous metal.

The sleeve 14 is first press-fit into the fitting portion 91 and then press-fit together therewith onto the receiving portion 42. A load of 200 to 300 kg is applied to press-fit sleeve 14 when it is formed of synthetic resin, and a load of about 500 kg is applied to the sleeve 14 when it is formed of nonferrous metal. Thus, the sleeve 14, once press-fit, is secured and remains in position.

Alternatively, the sleeve 14 may first be press-fit onto the receiving portion 42, or may be press-fit simultaneously with insertion of the fitting portion 91 onto the receiving portion 42.

The outer member 6 is provided on its inner periphery at both axial sides of ratchet teeth 61 with ball races 62 and 63. The first and second bearings 7 and 8 of balls are interposed between the ball race 62 and ball race 12a formed at the connecting portion 12 of the inner member 4 and second hub flange 3 and between the ball race 63 and ball race 92 formed at the outer periphery of cylindrical bearing member 9, thereby supporting the outer member 6 freely unidirectionally rotatably with respect to the inner member 4.

The sprockets 5 may be integrated with the outer member 6. However, the sprockets 5, as shown in FIGS. 1 and 2, may also be separate from the outer member 6 and arranged in a row through collars 15 inserted between each sprocket. Bolts 16 project through bores 51 formed at the sprockets 5 and screw at their tips with threaded bores at the smallest diameter sprocket to assemble all the sprockets 5. The sprocket assembly is sleeved onto the outer member 6 and fixed thereto through a ring plate 17 and snap ring 18.

Referring to FIG. 1, balls 24 are interposed between a ball race 2a provided at the first hub flange 2 and a ball race 23a at a bearing member 23 screwed with one axial end of hub shell 1 (the left end in FIG. 2), so that the hub shell 1 is supported at the one axial end of hub shell 1 rotatably to the hub shaft 20. Balls 22 are interposed between the ball race 93 at the cylindrical bearing member 9 and the ball race 21a at a bearing member 21 screwed with the other axial end (the righthand end in FIG. 1), so that the hub shell 1 is supported at its other axial end rotatably to the hub shaft 20.

In addition, in FIGS. 1 and 2, reference numeral 19 designates a stopper which is sleeved onto the hub shell 1 to fix the second hub flange 3 which is integral with the inner member 4. Reference numerals 25 and 26 designate lock nuts for the bearing members 21 and 23. Reference numerals 27 and 28 designate nuts for fixing the hub shaft 20 to a bicycle frame (not shown).

In the just described construction, the fitting portion 91 at the cylindrical bearing member 9 is press-fit onto the receiving portion 42 at the inner member 4 by the screwable rotation of bearing member 21 or hub shaft 20 or by other press-fitting means. In other words, the bearing member 21 is screwed with the hub shaft 20 to bias the cylindrical bearing member 9 axially inwardly through the balls 22 interposed between the ball races 21a and 93 to thereby press-fit the fitting portion 91 onto the receiving portion 42 through the sleeve 14.

Construction of the hub assembly proceeds as follows. The outer member 6 at first is sleeved onto the outer periphery of inner member 4 keeping the pawls 10 within the chambers A respectively, the first bearing 7 is interposed between the ball race 62 at the outer member 6 and the ball race 12a at the connecting portion 12, and the second bearing 8 is interposed between the ball race 63 at the outer member 6 and the ball race 92 at the outer periphery of cylindrical bearing member 9. Next, the sleeve 14 previously press-fit into the fitting portion 91 at the cylindrical bearing member 9, is kept in a condition of contacting at one axial end with the edge of receiving portion 42 at the inner member 4. Thereafter, the bearing member 21 is screwed with the hub shaft 20 to bias the cylindrical member 9 axially inwardly (axially leftwardly in FIG. 2) through the bearing 22, whereby the fitting portion 91 is press-fit onto the receiving portion 42 through the sleeve 14. During the press-fit, the bearing member 21 is further screwed forward upon light contact of the second bearing 8 with the ball race 63, then the outer member 6 restrains the cylindrical bearing member 9 from axially inwardly moving, thereby abruptly increasing the press-fit load applied to the fitting portion 91 due to screwing of the bearing member 21. At this time, the screwing of bearing member 21 ceases and it is then slightly unscrewed, so that the cylindrical bearing member 9 is released from the biasing force and is slightly axially outwardly returned (axially rightwardly returned in FIG. 2) by a spring back, that is, the reaction to the abruptly increased load occurring during the pre-fitting operation. As a result, the spring back places the fitting portion 91 in the best condition of fitting onto the receiving portion 42 at the inner member 4. In other words, the outer member 6 is kept in its optimum rotating condition. Furthermore, even when subjected to an unbalanced load during rotation of the sprockets, the cylindrical bearing member 9 is affected by no thrust, so that the rotating condition of outer member 6 as well as hub shell 1 may be kept in a good condition.

In lieu of using bearing member 21 for the press-fitting, a tool may be used for press-fitting of the fitting portion 91 onto the receiving portion 42.

Next, an embodiment facilitating removal of the cylindrical bearing member will be described.

Once the fitting portion 91 is press-fit onto the receiving portion 42, it is very difficult to remove the cylindrical bearing member 9 from the sleeve 14. However, a construction, as shown in FIG. 5, can facilitate the removal of cylindrical bearing member 9. As shown in FIG. 5, the cylindrical bearing member 9 is previously provided at the inner periphery of fitting portion 91 with a screw thread 95 and at the end face axially outward from the inner ball race 93 with a grooved rotary control element 94. Hence, the fitting portion 91 is screwably fit onto the sleeve 14 to form thereon a screw thread to mate with the thread at the fitting portion 91, whereby both the threads are used to remove the cylindrical bearing member 9 from the sleeve 14. Alternatively, a sleeve 14, which is previously threaded, may be screwed with the threaded fitting portion 91 so that the fitting portion 91 is screwably connected with the sleeve 14 and is press-fit onto the receiving portion 42 therethrough. In this instance, the cylindrical bearing member 9 is unscrewed from the sleeve 14 through a tool which is applied into the grooved rotary control 94, thus being removed from the inner member 4. In addition, it is preferable to provide at the outer periphery of receiving portion 42 ridges or knurls 42a extending axially thereof as shown in FIG. 5. Furthermore, in case that the sleeve 14 should be removed after the removal of cylindrical bearing member 9, a nut for pulling-out the sleeve is screwed with the thread formed at the sleeve 14 and then pulled axially outwardly to thereby remove with ease the sleeve 14 from the receiving portion 42.

As clearly understood from the aforesaid description, the rear hub of the invention is provided at the outer periphery of the inner member with a receiving portion and at one axial side of the cylindrical bearing member with a fitting portion, so that the fitting portion is press-fit onto the receiving portion through a sleeve, thereby fixing the cylindrical bearing member to the inner member. Hence, the outer member is kept in an optimum rotating condition by use of a spring back generated after a cessation of the press-fit operation.

In other words, when the fitting portion is press-fit onto the receiving portion, the ball race of the cylindrical bearing member abuts against bearings, such as balls, to abruptly increase a press-fit load. At this moment, a cessation of the press-fit load inevitably generates a spring back, which allows the cylindrical bearing member to return axially, thereby adjusting the outer member to its optimum rotating condition. Furthermore, to properly adjust the outer member to its optimum rotating condition only requires one to press-fit and fix the fitting portion of cylindrical bearing member, and to stop the press-fitting of the cylindrical bearing member upon encountering an increase of in the press-fit load. This also facilitates assembly of the outer member.

Moreover, even when subjected to an unbalanced load, the cylindrical bearing member is affected by no thrust, whereby the rotating condition of the outer member as well as the hub shell can be kept in a good condition for a long time.

While certain exemplary embodiments of the invention have been shown and described, the invention is not limited thereto as many changes can be made without departing from the spirit of the invention.

What is claimed is:

1. In a rear hub for a bicycle, which is provided with a tubular hub shell having first and second hub flanges, an inner member fixed to said hub shell and having a ball race formed axially inwardly of the inner member, an outer member supported rotatably with respect to said inner member and having at least one sprocket at the outer periphery of the outer member, first and second bearings carrying said outer member rotatably with respect to said inner member, a unidirectional rotary transmission interposed between the outer periphery of said inner member and the inner periphery of said outer member, and a cylindrical bearing member mounted on said inner member axially outwardly thereof and having ball races, the improvement comprising: a tubular receiving portion provided at said inner member axially outwardly thereof for insertably receiving said cylindrical bearing member; a fitting portion provided at one axial side of said cylindrical bearing member and having an inner periphery of larger diameter than an outer diameter of said receiving portion, to form an annular space between the outer periphery of said receiving portion and the inner periphery of said fitting portion; and, a sleeve press-fit into said annular space, said sleeve having a thickness larger than a radial width of said annular space, said sleeve, when inserted within said annular space, said cylindrical bearing member at a desired position on said receiving portion.

2. A rear hub for a bicycle according to claim 1, wherein said sleeve has at its one lengthwise end a flange extending radially outwardly of said sleeve contacting with an axially end face of said cylindrical bearing member.

3. A rear hub for a bicycle according to claims 1 or 2, wherein said sleeve is formed of a synthetic resin.

4. A rear hub for a bicycle according to claims 1 or 2, wherein said sleeve is formed of nonferrous metal.

5. A rear hub for a bicycle according to claim 1, wherein a screw thread is provided at the inner periphery of said fitting portion at said cylindrical bearing member, so that when said cylindrical bearing member is press-fit onto said inner member a screw thread is formed at said sleeve, making it possible to remove said cylindrical member by unscrewing it from said sleeve after said cylindrical member is press-fit onto said inner member.

6. A rear hub for a bicycle according to claim 1, wherein a screw thread is provided at the inner periphery of said fitting portion at said cylindrical bearing member and a screw thread screwable with said screw thread at said fitting portion is provided at the outer periphery of said sleeve, so that said screw thread at said sleeve is screwed with said screw thread at said cylindrical bearing member and said cylindrical bearing member together with said sleeve is press-fit onto said inner member, making it possible to remove said cylindrical bearing member by unscrewing it from said sleeve after said cylindrical bearing member is press-fit onto said inner member.

7. A rear hub for a bicycle according to claims 1, 5 or 6 wherein at the outer periphery of said receiving portion at said inner member are provided a plurality of ridges extending axially of said receiving portion.

8. A rear hub for a bicycle as in claim 3 wherein said synthetic resin is a diureide compound.

9. A rear hub for a bicycle as in claim 4 wherein said nonferrous metal is aluminum or copper.

* * * * *